B. G. BADHAM.
RING BEARING LUBRICATING DEVICE.
APPLICATION FILED OCT. 13, 1914.
1,152,872.
Patented Sept. 7, 1915.
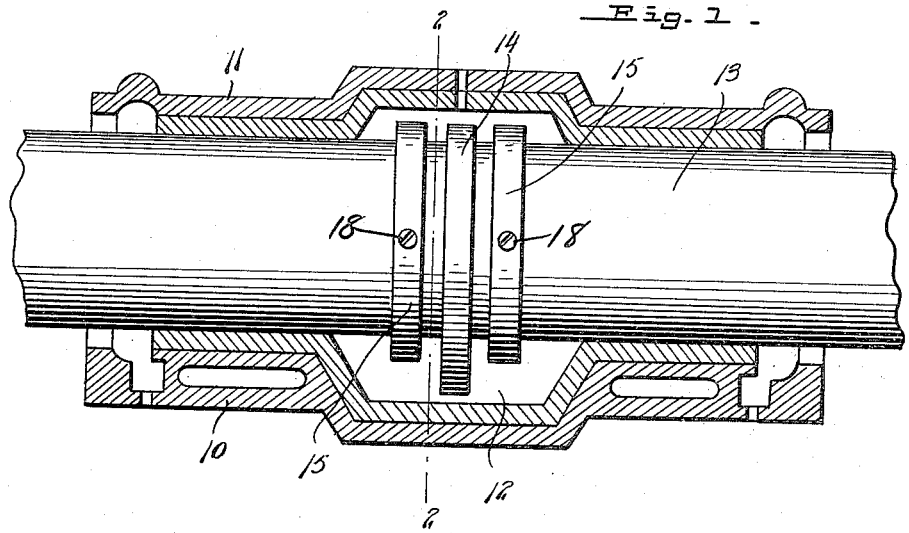
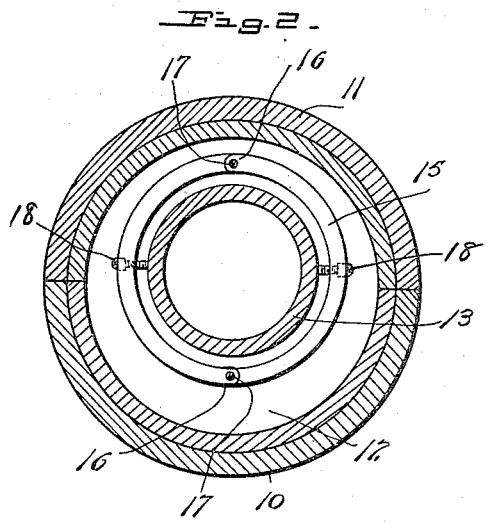
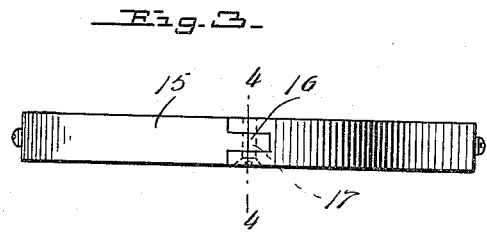
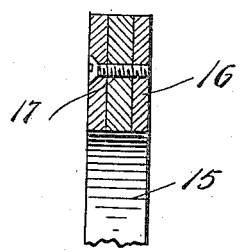
Witnesses
Inventor
B. G. Badham.
By
Attorneys

UNITED STATES PATENT OFFICE.

BERTRAM G. BADHAM, OF WAIHI, NEW ZEALAND.

RING BEARING-LUBRICATING DEVICE.

1,152,872.　　　　Specification of Letters Patent.　　Patented Sept. 7, 1915.

Application filed October 13, 1914.　Serial No. 866,539.

*To all whom it may concern:*

Be it known that I, BERTRAM G. BADHAM, a subject of the King of Great Britain, residing at Waihi, in the county of Ohinimuri, New Zealand, have invented certain new and useful Improvements in Ring Bearing-Lubricating Devices; and I do hereby declare the following to be a full, clear, and exact description of the invention, such as will enable others skilled in the art to which it appertains to make and use the same.

This invention relates to lubricating devices and has special reference to a ring lubricator for journal bearings and the like.

Experience has shown that, with the ordinary type of ring lubricator, the ring often moves to one end or the other of the bearing box chamber and contacts with the end wall or other stationary part of the bearing. When this occurs the ring "sticks" and the supply of lubricant to the journal ceases.

The principal object of the present invention is to provide improvements in devices of this character which will prevent sticking of the ring, the improvements being of such character as to be readily applied to any ordinary bearing without interrupting the flow of oil along the journal.

With the above and other objects in view, the invention consists in general of certain details of construction and combination of parts hereinafter fully described, illustrated in the accompanying drawings, and specifically claimed.

In the accompanying drawings, like characters of reference indicate like parts in the several views, and Figure 1 is a longitudinal section through a bearing arranged for ring lubrication, a portion of a shaft being shown in position equipped with the improved device. Fig. 2 is a section on the line 2—2 of Fig. 1. Fig. 3 is a detail view of a ring joint used herewith. Fig. 4 is a section on the line 4—4 of Fig. 2.

In the drawings illustrating one embodiment of the invention there is disclosed a bearing box having a base 10 and cap 11 secured in the usual manner. Within the bearing is a chamber 12 the lower part of which constitutes an oil reservoir. Through the bearing extends a shaft 13 and on this shaft is mounted the lubricating ring 14, the latter being of any preferred form and dipping into the oil in the reservoir. On each side of the ring 14 are other rings preferably termed guard rings and each of these guard rings consists of a plurality of uniformly shaped segments 15 connected by tongue and groove joints 16 through which pass screws 17. The rings thus formed are of sufficient diameter so that, when secured in position by the set screws 18 passing through respective segments, the rings will be spaced from the shaft, thus permitting uninterrupted flow of oil along the shaft. By reason of the provision of sectional rings they may be applied at any desired point and as they rotate with the shaft they will aid in causing the ring 14 to revolve with the shaft in case the latter contacts with either guard ring.

There has thus been provided a simple and efficient device of the kind described and of the character specified.

It will be obvious that many minor changes may be made in the form of construction of this invention without departing from the material principles thereof. It is not therefore desired to confine the invention to the exact form herein shown and described but it is wished to include all such as come properly within the scope claimed.

Having thus described the invention, what is claimed as new is:—

1. The combination with a shaft and a lubricating ring therefor; of guard rings surrounding said shaft in spaced relation thereto, said guard rings being arranged on opposite sides of said lubricating ring, and means to secure said guard rings to said shaft.

2. The combination with a shaft and a lubricating ring therefor; of guard rings each consisting of a plurality of detachably connected segments, surrounding said shaft in spaced relation thereto, said guard rings being arranged on opposite sides of said lubricating ring, and means to secure said guard rings to said shaft.

In testimony whereof, I affix my signature, in the presence of two witnesses.

BERTRAM G. BADHAM.

Witnesses:
　ARTHUR O. FIELD,
　WALTER FOSTER.

Copies of this patent may be obtained for five cents each, by addressing the "Commissioner of Patents, Washington, D. C."